Sept. 15, 1925.

W. L. BRUNER

CABLE SHOCK ABSORBER

Filed Nov. 17, 1922

1,553,890

WITNESSES

Inventor
William Leslie Bruner

Patented Sept. 15, 1925.

1,553,890

UNITED STATES PATENT OFFICE.

WILLIAM LESLIE BRUNER, OF WICHITA FALLS, TEXAS.

CABLE SHOCK ABSORBER.

Application filed November 17, 1922. Serial No. 601,564.

*To all whom it may concern:*

Be it known that I, WILLIAM LESLIE BRUNER, a citizen of the United States, residing at Wichita Falls, in the county of Wichita and State of Texas, have invented a new and useful Cable Shock Absorber, of which the following is a specification.

This invention comprehends a cable shock absorber designed to keep a cable from breaking and prevent excessive stretching of the same. The device is to be used on well machinery, derricks and the like.

Another object of this invention is to provide a device of this nature to be used on derricks and the like, where cables are used, to keep the cable tight at all times, thus preventing a cable from getting loose and when the power is applied preventing the sudden jerk from breaking the cable.

Another object of this invention is to provide a device of this nature that can be manufactured at a very nominal cost.

The nature and advantages of the invention will be better understood when the following detailed description is read in connection with the accompanying drawing forming a part of this application. The invention resides in the construction, combination and arrangements of parts as claimed.

In the accompanying drawing the various parts are referred to by numbers.

Figure 1:
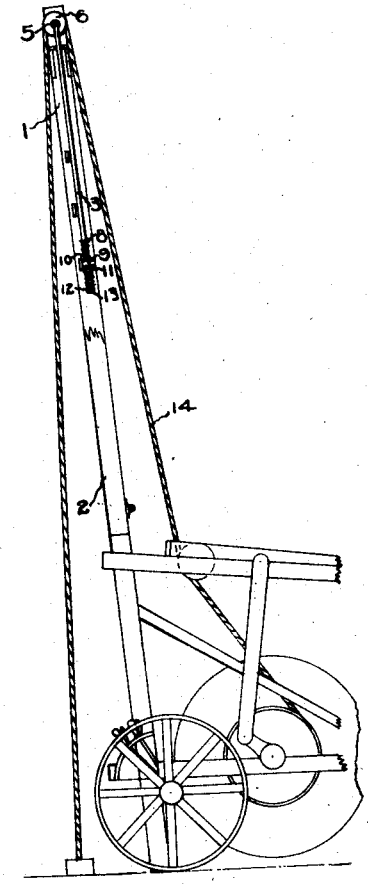
Figure 1 is a side view showing the method of using the cable.
Figure 2:
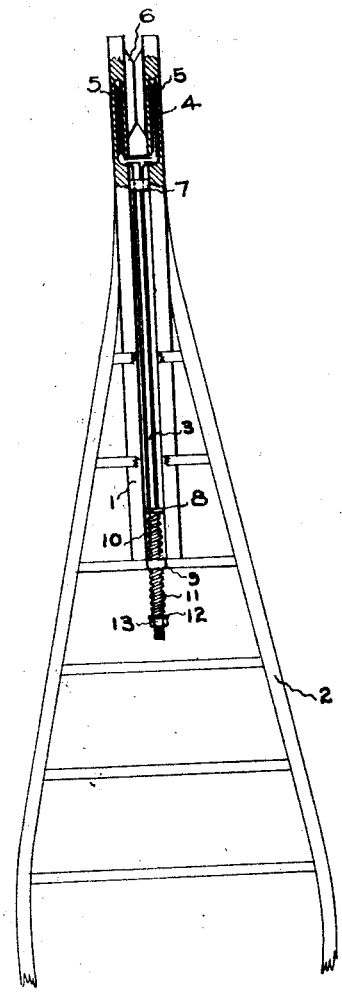
Figure 2 is an enlarged view showing the top of a derrick and method of constructing the cable shock absorber.

The device forming the subject matter of this invention comprises two main supports 1 which are attached to the derrick 2. The derrick and drilling machine illustrated in the accompanying drawing are not claimed as a part of this application, but are merely shown to illustrate the method of using the cable shock absorber. 3 is a shaft, 4 is a fork shaped member forming a part thereof to support the pulley shaft 5, the pulley 6 is supported by the pulley shaft 5, the guide 7 is attached to the two main supports 1 and arranged to hold the shaft 3 in place, 8 is a collar forming a part of the shaft 3, 9 is a guide attached to a cross bar of the derrick 2, which holds the lower end of the shaft 3 in position, 10 and 11 are two springs, the spring 10 being arranged above the guide 9 and the spring 11 being arranged below the guide 9, 12 is a flat washer, the nut 13 being threaded on shaft 3. It will be noted that by tightening or loosening the nut 13 the tension of the springs 10 and 11 may be arranged as desired, thus providing means of enabling the cable shock absorber to carry loads of various weights with equal efficiency.

While it is believed from the foregoing description the nature and advantages of the device will be readily apparent, I desire to have it understood that I do not limit myself to what is herein shown and described, and that such changes may be resorted to when desired as fall within the scope of what is herein claimed.

What I claim is:

1. A cable shock absorber of the character described comprising two supports attached to a derrick and provided with two guides, a vertical slidable shaft mounted in the guides, a fork shaped member forming a part of said shaft, a pulley shaft and pulley supported in the fork shaped member, two springs arranged on the shaft, one above the lower guide and one below the said lower guide, a flat washer and a nut on the lower end of said shaft, and a collar on the shaft above the upper spring.

2. A cable shock absorber as set forth comprising a shaft having upper and lower guide means and disposed vertically in a derrick, said shaft having a fork shaped member at the top thereof, a pulley mounted in said fork shaped member, springs adjustably disposed on said vertical shaft, one of said springs located above said lower guide means and one of said springs disposed below said lower guide means, and a collar on said shaft forming an abutment for said upper spring.

WILLIAM LESLIE BRUNER.